United States Patent Office 3,515,847
Patented June 2, 1970

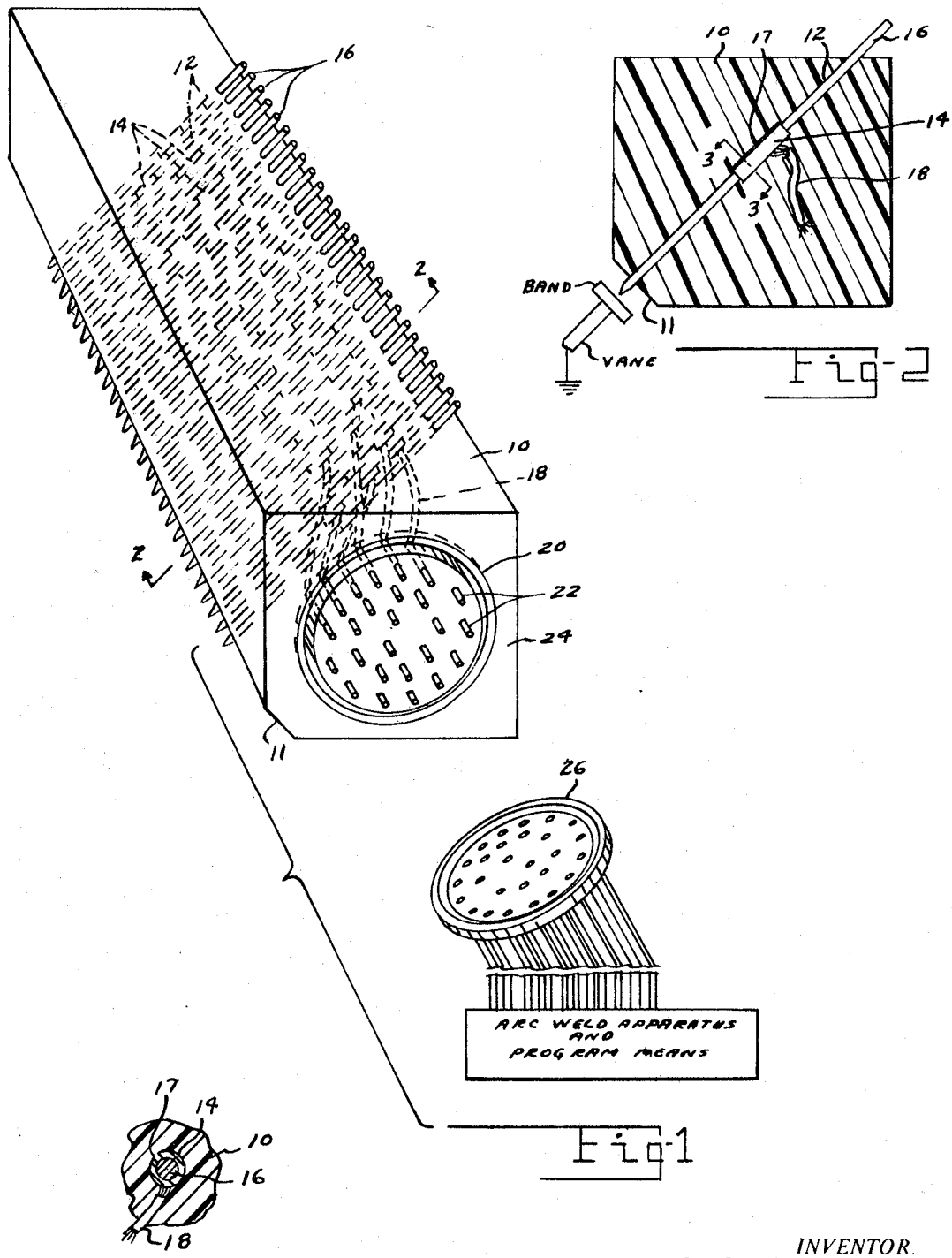

3,515,847
WELD ELECTRODE HOLDER
Gilbert E. Flowers, Cincinnati, Ohio, assignor to the United States of America as represented by the Secretary of the United States Air Force
Filed Apr. 30, 1968, Ser. No. 725,373
Int. Cl. B23k 9/28
U.S. Cl. 219—138                1 Claim

ABSTRACT OF THE DISCLOSURE

A holder for a plurality of electrodes used in a programmed sequence of arc welding. The electrodes are fitted into a plurality of corresponding holes in a molded block of insulating material to which is attached a multiple pin plug. Spring contacts coaxial with the welding electrode are molded in the block and frictionally engage the electrodes. Leads are also molded in the insulating material of the block and extend from the contacts to the multiple pin plug for electrical connection.

BACKGROUND OF THE INVENTION

Field of the invention

This invention relates to arc weld apparatus and, more particularly, to multiple electrode holders as used in programmed arc welding.

Description of the prior art

Previous power connections to arc weld electrodes included external leads and exposed contacts. Among disadvantages encountered, particularly for programmed inert gas multiple electrode (PIGME) welding process and apparatus, were excessive labor in changing electrodes, fragile materials and undesirable connection mehods.

Weld electrodes were fitted into holes of an insulating body. Individual set screw locking devices in this body were threaded in through drilled and tapped passages located transversely of axes of the electrodes in the holes. Usefulness of the insulating body was limited to a short duration of time due to rapid wear of locking screw threads in the insulating body. During electrode replacement, added time was expended for cataloguing each contact and lead with the mating electrode needed to avoid losing the proper weld sequence.

U.S. Pat. 3,114,829, Libby, issued Dec. 17, 1963, on Arc Welding Method and Apparatus discloses operation and programming means to schedule the arcing of successive nonconsumable electrodes in continuous sequence. There is control of the flow of energy to each electrode according to variations in shape of juncture, type of material, and workpiece thickness. This patent shows an earlier electrode holder, in conjunction with inert gas atmosphere that helps to ionize the arc and to inhibit the workpiece materially from oxidizing. FIGS. 1 and 2 of U.S. Pat. 3,350,534, Libby, issued Oct. 31, 1967, show a welding electrode holder having setscrew locking devices. Further example of welder and electrode use is shown by U.S. Pat. 3,264,524, Dahlgren, dated Aug. 2, 1966, involving resistance welding in FIG. 5 with a pair of opposite electrode holders. A multiple coaxial electrode holder and welding means for an automatic production process is disclosed by FIGS. 3 and 5 of U.S. Pat. 3,274,736, Hotine et al., dated Sept. 27, 1966. The cited patents show only external connections for electrode energization.

SUMMARY OF THE INVENTION

Durability, protection against lead mix-up, more efficient electrical connections, less maintenance time and optimum control of electrode alignment are among advantages of this invention. These advantages are realized with a block of insulating material having multiple electrode holes cast into coaxial alignment with resilient, spring-loaded electrical contacts. The contacts are anchored inside the block and are concentric with the electrode holes. Welding electrodes are infinitely adjustable in the holes by slide fit axially through the contacts within the block. A laterally positioned multiple pin plug is carried by the block of insulating material. The block material encapsulates leads between internal contacts and the multiple pin plug. Proper weld sequence and uniform weld electrode alignment are certain during electrode maintenance, positioning, removal and/or replacement, individually or in groups.

An object of this invention is to facilitate change and adjustment of weld electrodes within holes of an insulating block in which contacts and leads are encapsulated for protection, for maintenance of programmed weld sequence, and for durable control of electrode alignment.

BRIEF DESCRIPTION OF THE DRAWINGS

FIG. 1 is a perspective view of a weld electrode holder having features of the present invention;

FIG. 2 is a cross-sectional view taken along line 2—2 in FIG. 1 and including a phantom showing of vane-band weldments; and FIG. 3 is a fragmentary cross-sectional view taken along line 3—3 in FIG. 2.

DESCRIPTION OF THE PREFERRED EMBODIMENT

Referring to FIGS. 1 and 2, an elongated, rectangular block 10 of cast plastic insulating material is shown having a portion 11 that incorporates a recess or void, shaped to a particular weldment. Electrode holes 12 parallel to each other are cast in plural locations diagonally in the block 10. Cylindrical spring-loaded electrical contacts 14 are encapsulated by the block 10 and are aligned accurately in positions coaxially of and concentric with holes 12 as subsequently described. Welding electrodes 16 are infinitely adjustable in slide fit, axially of the holes. The contacts 14 are engaged electrically in a resilient and concentric fit around the weld electrodes. Individual electrodes 16 or groups of electrodes, of tungsten or related type, are readily removable, replaceable, or variably positioned during maintenance. Optionally, a longitudinal slit 17, for added resilience in electrode engagement, is provided with the cylindrical contacts as indicated in FIGS. 2 and 3. Leads 18 are secured suitably to contacts 14 as encased in the block 10 of silica-silicate insulating material known as Sauereisen No. 31, for example.

Electrode holes 12 are formed during casting of insulating material in a suitable mold having removable dummy rods or projections (not shown). During casting and cure of insulating material of block 10, such rods or projections simultaneously simulate the subsequently insertable electrodes 16 and support the contacts 14 secured to leads 18. The leads 18 and contacts 14 embedded in insulating block 10 are shielded and externally sealed off for protection against dirt and foreign material. The electrodes 16 have slide fit in electrical and sealing engagement with inner periphery of the contacts 14.

A plug 20 having multiple pins 22 is carried by the block 10 in a lateral position away from the holes 12. Leads 18 interconnect the contacts 14 and pins 22 by suitably brazed, soldered or other electrical bond junctures encapsulated in the block 10 as a unitary assembly. A socket 26 mates with the plug 20 as represented in FIG. 1 and assures interconnection for maintenance of programmed weld sequence regardless of electrode replacement. Suitable plugs and sockets are commercially available from Amphenol Corporation; programmed inert gas multiple electrode weld apparatus is commercially available from the Thompson Welder Company of Lynn, Mass.

Plug 20 and pins 22 are readily accessible in a circular cluster located at one end 24 of the block 10. Electrode holes 12 are completely unencumbered by any leads or contacts in external locations now kept free and open to assure access for electrode servicing. Drilled and tapped holes as well as thread-wearing set screws are eliminated along with accompanying short life and maintenance disadvantages. Permanent alignment is built-in and assured due to coaxial relationship of contacts 14 and electrode holes 12. The compact unitary component assembly obviates cataloguing of each contact connection to avoid lead mix-up during pairing with mating electrodes in replacement service work. The contacts 14 are always in position axially of the electrode holes 12 and alternately staggered to facilitate lead location on either side of substantially coplanar, parallel alignment of electrode holes 12 in elongated configuration of block 10.

Features of this invention, as used with programmed inert gas multiple electrode systems, for example, are applicable particularly for joining aluminum, magnesium, copper, stainless steel, and alloys of these metals used in jet engines and/or aerospace environment. In FIG. 2, a phantom illustration is provided of a vane being arc weld joined to a band of a nozzle diaphragm of a jet engine.

What is claimed is:

1. An integral holder for a plurality of arc welding electrodes as used in programmed linear welding, said holder comprising: a solid molded block of a heat resistant plastic insulating material having a plurality of equally spaced straight electrode receiving holes of circular cross section molded therein and extending completely therethrough, said holes providing a sliding fit to said electrodes and having axes lying in a surface which, when extended, contains the weld line; annular spring contacts molded in said block in coaxial alignment with said holes at locations intermediate the ends of the holes, said contacts gripping the electrodes with sufficient force to make good electrical contact therewith and to hold the electrode fixed in any desired longitudinal position in the hole during the welding operation while permitting a sliding longitudinal adjustment of the electrode position and while permitting electrode replacement by withdrawal of the old electrode and insertion of a new electrode in its place; a multiple pin plug having its terminal side molded into said block; and electrical conductors molded in said block connecting said contacts to the terminals of said plug.

References Cited

UNITED STATES PATENTS

| 2,984,816 | 5/1961 | Wallace | 339—198 X |
| 3,038,117 | 6/1962 | Blain | 339—117 X |
| 3,114,829 | 12/1963 | Libby | 219—124 |
| 3,221,095 | 11/1965 | Cook | 174—68.5 |
| 3,350,534 | 10/1967 | Libby | 219—60 |
| 3,402,380 | 9/1968 | Gaw | 339—94 X |

JOSEPH V. TRUHE, Primary Examiner

C. L. ALBRITTON, Assistant Examiner

U.S. Cl. X.R.

219—139; 339—198